Sept. 23, 1969  D. H. GOMPERT  3,468,380
PROBE-TYPE WEEDER AND THINNER APPARATUS
Filed June 8, 1966  3 Sheets-Sheet 1
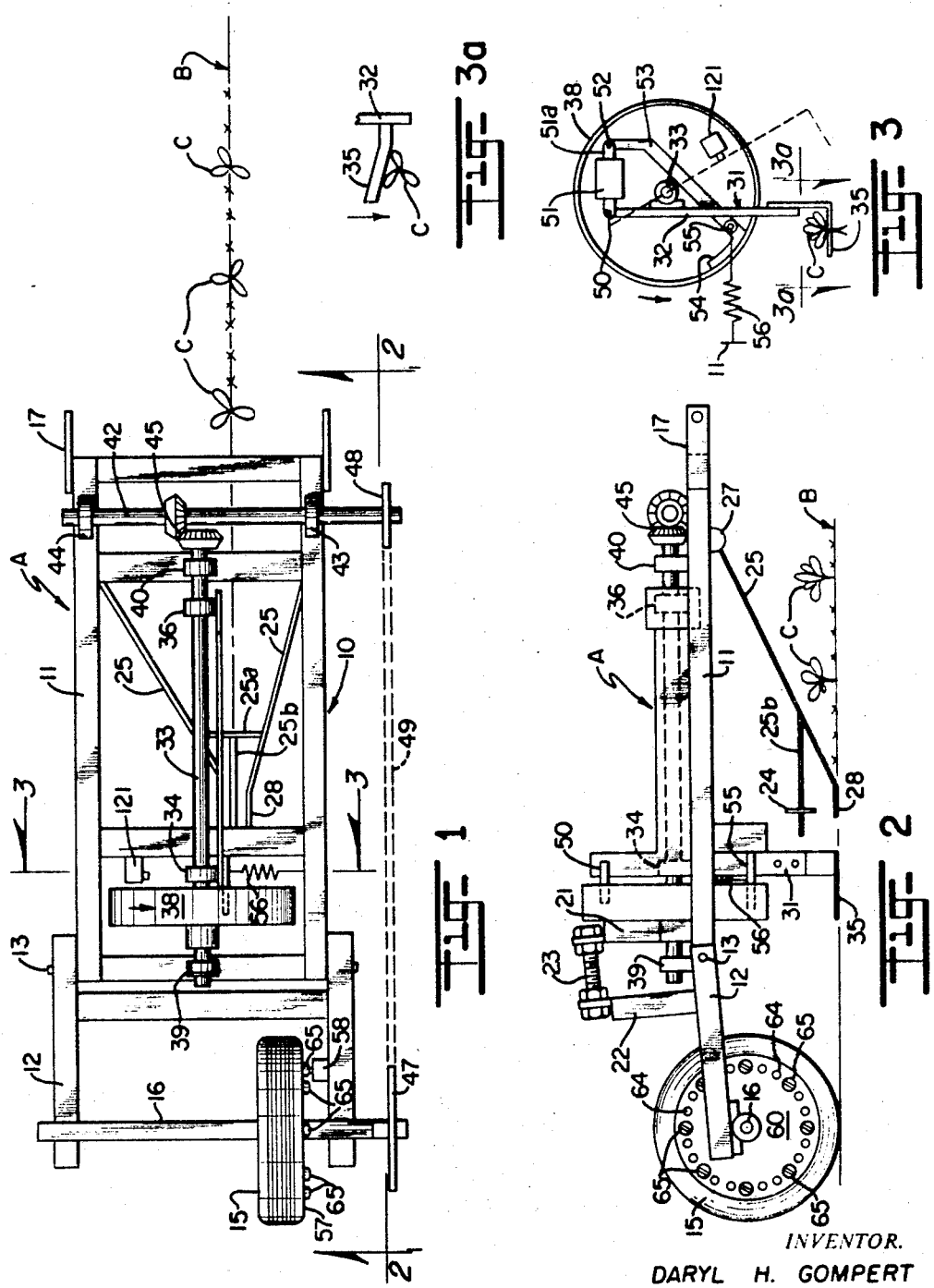
INVENTOR.
DARYL H. GOMPERT
BY
McGraw and Edwards
ATTORNEYS

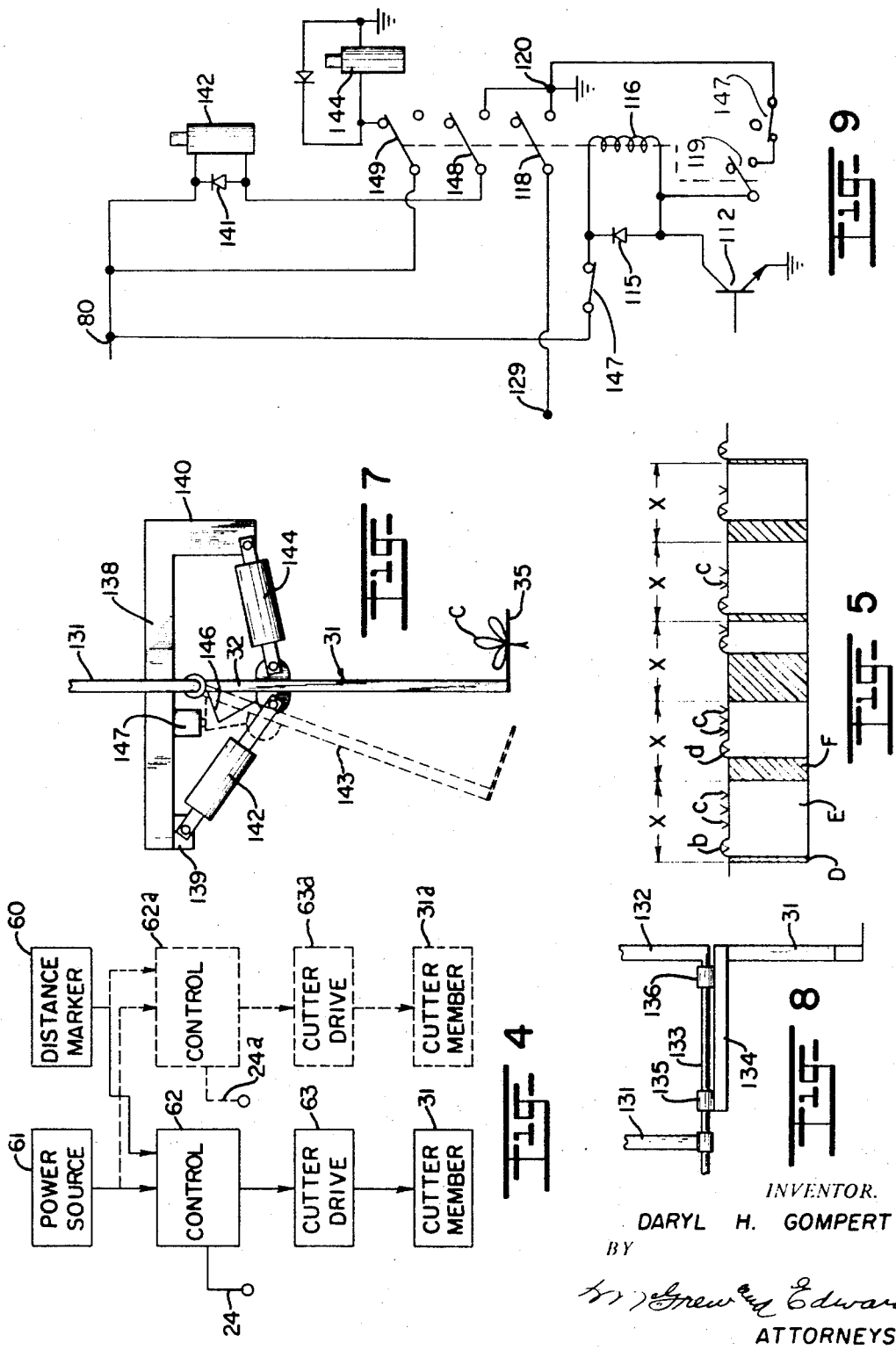

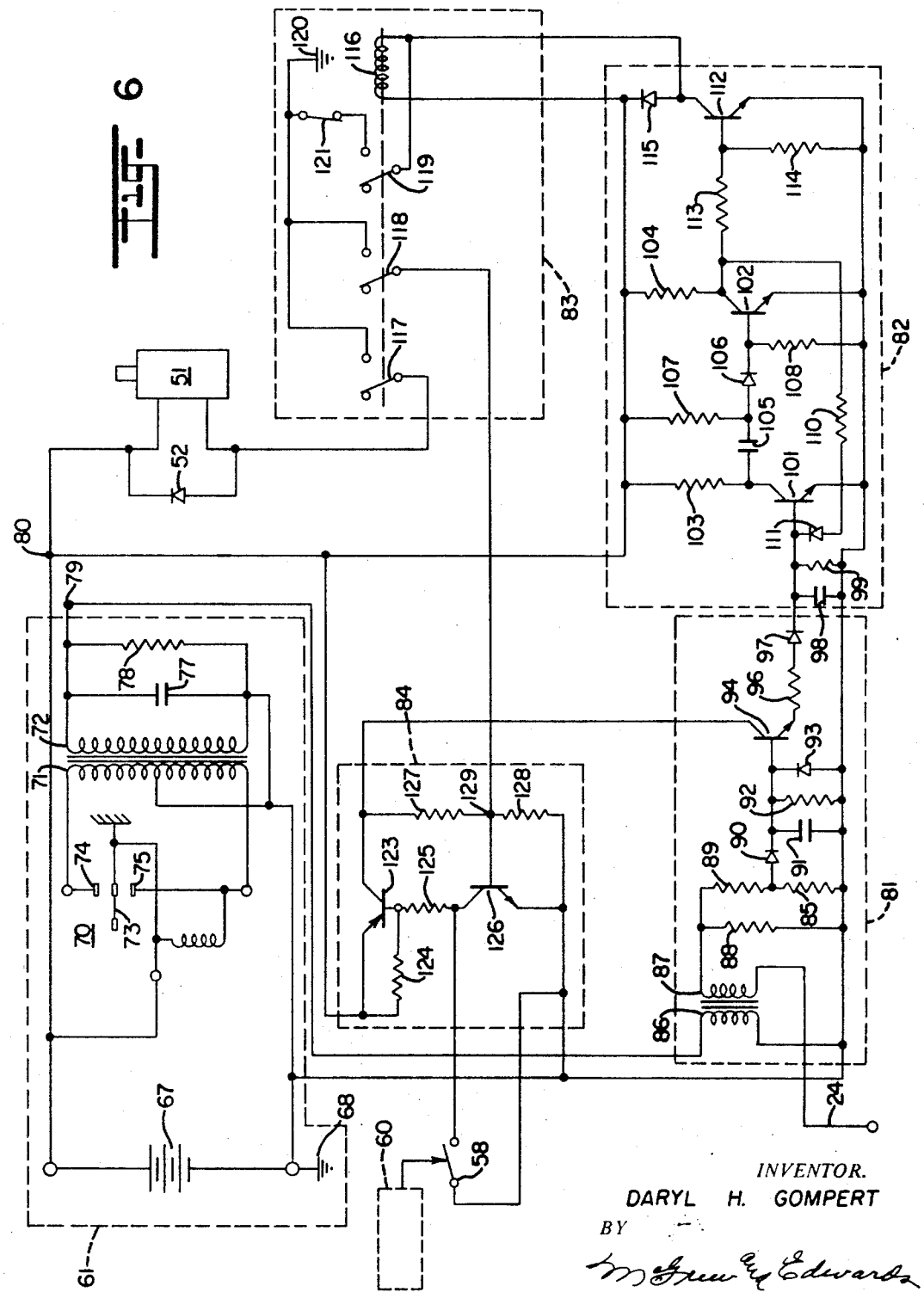

United States Patent Office 3,468,380
Patented Sept. 23, 1969

3,468,380
PROBE-TYPE WEEDER AND THINNER APPARATUS FOR ROW CROPS
Daryl Herman Gompert, Mitchell, Nebr. 69357
Filed June 8, 1966, Ser. No. 556,015
Int. Cl. A01b 63/16, 33/00
U.S. Cl. 172—6                                    13 Claims

ABSTRACT OF THE DISCLOSURE

Row crop thinner apparatus having a horizontal frame wheel supported at its rear and means attached to the frame for moving the apparatus along a plant row, a plant-contacting probe carried along the row, a cutter member pivotally supported on the frame rearwardly of the probe in a normal cutting position adjacent the row surface, drive means responsive to vehicular movement for swinging the cutter about its pivotal axis out of contact with plants in the row and including a hollow drum on a horizontal shaft and a shoe supported adjacent the inner surface of the drum connected to a solenoid directing cutter movement, and control means directed by probe contact with a growing plant for energizing the solenoid to swing the cutter out of row contact and to return the cutter to its normal position after a predetermined time interval.

---

This invention relates to crop thinner and weeder apparatus and more particularly to automatic row crop thinner and weeder apparatus particularly suitable for various types of row crops such as beets, cotton and the like.

Various type of row crops such as beets and the like require proper spacing and frequent weeding to produce a healthy plant. In the past this thinning and weeding operation has been primarily accomplished by hand labor which is slow, and involves considerable expense and supervision. Several types of mechanical thinners have heretofore been tried but have not been suitable for all applications and lack the ability to detect individual plants for weeding therebetween and to provide more uniform spacing between growing plants in a thinning operation.

Accordingly, it is an object of this invention to provide an automatic crop thinner and weeder which is simple, reliable and can be easily duplicated for multiple row operation.

Another object of this invention is to provide a crop thinner and weeder which is adapted to be operated on a continuous basis, and which is actuated by sensing means responsive to a growing plant in the row and leaves only selected growing plants in the row, and which also may be used for weed removal from the row.

It is a further object of this invention to provide a novel automatic crop thinner and weeder apparatus which is fast, accurate and economical and which is adaptable for thinning and weeding, or weeding only.

It is still a further object of this invention to provide an automatic crop thinner and weeder apparatus which is adjustable for sensing different sizes of plants and for varying the spacing between plants.

Other objects reside in novel details of construction and novel combinations and arrangements of parts, all of which will be set forth in the course of the following description.

The practice of the invention will be best understood by reference to the accompanying drawings, in the several views of which like parts bear similar reference numerals and in which:

FIG. 1 is a top plan view of the mobile body for the crop thinner and weeder apparatus embodying this invention;

FIG. 2 is a sectional side elevation view of the mobile body shown in FIG. 1 with a section taken along line 2—2 omitting the power transmission means from the rear axle to the forward drive shaft from FIG. 1;

FIG. 3 is a sectional view taken along lines 3—3 of FIG. 1 showing the interior of the drum and the clutch mechanism for the cutter member;

FIG. 3a is a sectional view taken along lines 3a—3a of FIG. 3 showing the diagonal shaping of the blade;

FIG. 4 is a schematic block diagram of an automatic control system embodying this invention showing the system suitable for multiple row operation in broken lines;

FIG. 5 is a schematic diagram of the sequence of operation of the crop thinner and weeder apparatus embodying this invention indicating the plant selection and probe sensing during travel along the plant row;

FIG. 6 is an electronic circuit diagram suitable for the automatic control illustrated in FIG. 5 with portions of the circuitry grouped in blocks indicated by broken lines;

FIG. 7 is a rear elevation view of another drive arrangement suitable for attachment to various mobile bodies for selectively driving the cutter member between the normal cutting position and the out-of-normal non-cutting position;

FIG. 8 is a side elevation view of the drive arrangement shown in FIG. 7 showing only the suspension of the cutter member with the electric solenoids removed; and FIG. 9 is a schematic circuit diagram suitable for the alternate drive arrangement shown in FIGS. 7 and 8 suitable for use with the electronic circuit shown in FIG. 6.

Referring now to the drawings and particularly FIGS. 1–3 there is shown a mobile body generally designated A adapted to be drawn along a plant row B. This mobile body has a substantially horizontal frame member 10 of lengthwise and transverse structural members inclusive of a forward portion 11 and a rearward portion 12 pivotally connected or hinged at adjoining ends by a cross pin 13. The forward portion 11 extends into the rearward portion 12 a substantial distance on each side of the pivotal pin connection 13.

The frame member is supported above the plant row B by an assembly of a wheel 15 and axle 16 attached to the rearward portion 12. A hitch 17 is attached at its forward portion 11 for coupling the body to a pulling vehicle (not shown) such as a tractor and the like for moving the mobile body A along the plant row B. While a draw type frame has been illustrated, the frame may be arranged as a pusher type unit when desired.

Upright members 21 and 22 are disposed on the forward portion 11 and the rearward portion 12 of the frame member, respectively, and are joined at their upper ends by a threaded member 23 so that rotation of this threaded member changes the angle between the forward and rearward frame portions 11 and 12 and thereby the height of the frame member 10 with respect to the ground.

A probe 24 is supported over the plant row B by a depending support member 25 for contacting growing plants designated C. Support member 25 is pivotally attached at its forward end 27 to the undersurface of frame portion 11 and extends rearwardly to spaced skid surface portions 28 slidable along the ground outwardly of the probe 24 and plant row B. Probe support member 25 includes portion 25a extending transversely of the plant row and portion 25b extending lengthwise of the plant row and disposed intermediately of the pivotal attachment 27 and skid surface portion 28. Probe 24 is attached to the rearward end of lengthwise portion 25b and may be positioned thereon at selected positions along portion 25b and vertically with respect thereto to provide adjustment of the probe spacing with respect to the trailing cutter member and the plants C in the row which have attained a particular height.

A cutter member 31 is disposed rearwardly of the probe 24 and in the normal cutting position shown in FIGS. 2 and 3 is adjacent the surface of the row for cutting vegetation in the row as the mobile body A is moved along the row. Cutter member 31 includes a shank member 32 pivotally supported on a shaft 33 carried on the frame member by rearward and forward bearings 34 and 36. A blade 35 having a forward cutting edge is attached to the lower end of the shank member 32 for pivotal movement therewith on shaft 33. Blade 35 extends horizontally with respect to the ground surface and rearwardly on a diagonal as shown in FIG. 3a. The position of the blade 35 with respect to the soil surface is adjustable by movement of threaded member 23, previously described, which raises or lowers the frame member, or the blade may be made slidable on shank member 32. Various types of weeds or crops will determine in which adjacent position the blade is with respect to the ground surface of the row. Some types will require a deep cut in which case the blade will be disposed in an adjacent position a substantial distance below the soil surface. Other types will require a shallow cut with the blade 35 only slightly below the ground surface or for other applications on or above the ground surface of the row.

A mechanical drive and clutching arrangement is illustrated in FIGS. 1-3 for movement of the cutter member to its out-of-normal position to avoid cutting vegetation in the plant row. The mechanical drive for the cutter member includes shaft 33 which is centrally disposed lengthwise of the forward frame portion 11 and rotatably mounted at its ends on bearings 39 and 40 and intermediate bearings 34 and 36 above described. Another shaft 42 transverse to shaft 33 is rotatably mounted at its ends on bearings 43 and 44 and rotatably coupled to the forward end of the drum shaft by a right-angle bevel gear assembly 45.

Rotary motion produced by drawing the mobile body A along the row is transmitted from the support wheel 15 and axle 16 to the shaft 33 by means of a power transmission assembly including a sprocket 47 on the axle 16 and a sprocket 48 on the shaft 42 drivably connected by a chain 49 or the like (FIG. 1). Movement of the mobile body A thus transmits rotary motion to the shaft 33 through chain 49, shaft 42, and the right-angle bevel gear 45 for rotation of the shaft 33 in a counterclockwise direction as indicated by an arrow at all times when the mobile body A is moved along the row.

A clutching assembly is provided for selectively transferring the rotary motion from the shaft 33 to the cutter member 31. The clutching assembly may be of various types for selectively transferring rotary motion from the wheel 15 of the cutter member 31 such as a disc-type clutch assembly. The clutching assembly or mechanism as shown in FIG. 3 includes a hollow drum 38 fitted on shaft 33 for rotation therewith and a shoe member 54 having a curved exterior surface. An electric solenoid 51 having a movable core portion 51a is pivotally attached at one end by a pin 50 to the top of the shank portion 32 and is pivotally attached at its other end by a pin 52 to the top of a shoe lever 53 which depends downwardly and inclines inwardly to support shoe 54 at the lower end of the shank portion to dispose the curved shoe surface in a normally spaced relationship to the inner surface of the drum 38. The lower inclined portion of the shoe lever 53 is pivotally supported on a pin 55 which is joined to the shank portion 32 intermediate its ends.

Energization of the solenoid 51 by a control system as hereinafter described pulls the core portion 51a into its coil and pivots the lever 53 counterclockwise about pin 55 to move shoe 54 outwardly against the drum. Rotary motion of drum 38 in the counterclockwise as shown is then transmitted to the cutter member 31 through shoe 54 and pin 55 which pivots the knife about the axis of shaft 33 out of the plant row through an arcuate path to a position as indicated by broken lines, at which point a normally closed limit switch 121 supported on the frame member is opened. Opening of limit switch 121 deenergizes solenoid 51 through the control circuit in a manner described more fully hereinafter so that a bias means 56 such as a spring or the like which is connected between the frame member 10 and the cutter member 31 will return the cutter member to the cutting position. Thus the time interval between the energization of solenoid 51 and the closure of switch 121 as above described determines how long the knife is out of the row or cutting position and this time interval may be adjusted by changing the speed or diameter of drum 38 and the distance between cutter member 31 and switch 121.

A distance marker designated 60 for measuring the distance of travel of the mobile body A and thus the probe 24 includes a cam surface 57 disposed on the outer surface of the wheel 15 which alternately opens and closes a normally open electric switch 58 mounted adjacent the outer wheel surface on the frame member 10 in accordance with the distance of travel of the mobile body A. Cam surface 57 includes a plurality of threaded apertures 64 disposed in spaced circumferential relationship on the exterior surface of the wheel 15 with selected of said apertures supporting elongated protruding threaded members 65 such as bolts or the like which act as cams and engage and close the switch 58 during rotation of the wheel 15. It is apparent then that by selecting different spacing for holes 64 and selecting the number of threaded members 65 therein selected distances of travel of the mobile body A may be measured.

Referring now to the schematic block diagram of FIG. 4 and the schematic operation diagram of FIG. 5 the automatic control system and the sequence of operation of all of the apparatus hereinabove described will now be set forth.

A power source 61 preferably electric and preferably taken from the D.C. battery of the drawing vehicle such as a tractor and the like provides the power for the automatic control system. The output of the power source 61 is connected to a control 62 and provides the power to the cutter drive 63. The output of the distance marker 60 is connected to the control 62 and also the probe 24 is connected to control 62. The output of the control 62 regulates the cutter drive 63 which in turn actuates the cutter member 31.

The operation will now be described beginning with the assumption that the distance marker 60 has traveled a sufficient distance to permit the probe 24 to be sensitive. A sensitive probe as hereinafter referred to describes the condition of the probe which will apply an electrical signal to the control circuitry in response to plant contact to actuate the cutter drive 63 to move the cutter member 31 out of the cutting position. Initially, the cutter member 31 is disposed in a normal cutting position adjacent the surface of the row at a position substantially on the ground surface for purposes of illustration for removal of vegetation in the row as shown in FIG. 3. The interval of probe sensitivity immediately prior to probe contact with plant $b$ in the row is illustrated as a sectioned area designated D in FIG. 5. When the sensitive probe contacts plant $b$, the output of control 62 controls the actuation of the cutter drive 63 to swing the cutter member 31 out of the row B so as to miss the sensed plant $b$ as illustrated by the curved line over plant $b$ in FIG. 5.

The output of the control 62 in response to probe contact with the plant effects actuation of the cutter drive 63 to move the cutter member 31 out of the row where it is held until the sensed plant $b$ is passed, after which time spring 56 immediately returns the cutter member 31 to the cutting position so as to cut vegetation such as weeds or undesirable plants indicated on FIG. 5, designated $c$.

At the same time cutter drive 63 is actuated through control 62, probe 24 is de-sensitized by control 62 for a distance E which is the remainder of a preselected interval of distance X as the distance measured from the time probe 24 is first sensitive to the time probe 24 is again sensitive, determined by distance marker 60 and shown in FIG. 5. Thus, after the mobile body A and the probe 24 have traveled the preselected distance X, control 62 is enabled by the distance marker 60 so as to again make the probe sensitive (distance F) to plant contact until another plant d is contacted by the sensitive probe 24 whereupon the above described sequence of operation is repeated as shown in FIG. 5.

Referring again to FIG. 4, multiple row operation of this automatic control system is illustrated in broken lines. A single power source 61 and distance marker 60 are suitable for use with multiple probes 24a, controls 62a, cutter drives 63a, and cutter members 31a. While only one additional of these multiple components is illustrated, it is understood that multiple similar components may be connected in parallel with a single power source 61 and distance marker 60.

Referring now to FIG. 6, circuitry including electronic components is illustrated as one arrangement for the control generally designated 62 in FIG. 4 in combination with the other structure previously described. Broken lines are used for the block diagrams which will first generally be described followed by a specific description of the specific circuitry contained in each block diagram.

Power source 61 is shown to include the tractor battery 67 which may be either the usual 6-volt or 12-volt D.C. The negative terminal of this battery is connected to a ground 68 for the electrical system as hereinafter described. Power source 61 also includes a D.C. to A.C. converter to provide an alternating current source for the detector as hereinafter described. This converter includes a vibrator 70 which may be electronic but is herein illustrated as mechanical and a step-up transformer having a primary winding 71 and a secondary winding 72 having a central tap connection to the ground 68. The vibrator 70 includes a vibrating member 73 which is mechanically moved to engage a pair of spaced stationary contacts 74 and 75 connected to opposite ends of the primary winding 71 for alternately connecting the D.C. voltage of battery 67 to the primary winding 71, thus inducing a substantially alternating current in the secondary winding 72. The A.C. voltage produced across the secondary winding 72 is filtered by a parallel capacitor 77 and resistance combination 78 and this A.C. voltage source appears at an A.C. output terminal designated 79. The D.C. voltage of the battery appears at a D.C. output terminal designated 80.

The control 62 includes a detector 81, a relay drive 82, a relay 83 and a detector control 84 electrically interconnected as hereinafter described. The detector 81 includes a step-up transformer having its primary winding 86 connected to the A.C. output terminal 79 and ground 68 and a secondary winding 87 connected at one end to probe 24. The A.C. voltage from power source 61 is always applied to the primary winding 86 and the secondary winding is essentially open until probe 24 contacts a plant B. The electric resistance to a ground of a growing plant is sufficiently low at the range of primary winding voltages for grounding the secondary winding 87 for producing a voltage in that secondary winding 87. This A.C. voltage applied to the primary winding is induced in the secondary winding and applied to a parallel circuit including a resistor 88 connected in parallel with other resistors 85 and 89. A rectifier or diode 90 is connected intermediate of resistors 85 and 89 for rectifying the A.C. appearing across resistor 85. A parallel capacitor 91, resistors 92, and diode 93 are connected from one side of the diode 90 to a solid state element 94 and preferably the base of an NPN transistor connected in the detector 81 as a high impedance transistor amplifier. The collector of this transistor 94 is connected to the collector of a solid state transistor of the detector control 84 as hereinafter described so that when the distance marker 60 through the switch 58 activates the detector control 84 a voltage appears on the collector of this transistor 94 to sensitize probe 24. An electrical output can now be produced at the emitter of transistor 94 when probe 24 contacts a plant. This output is applied to a series resistor 96 and diode 97. The detector control 84 therefore will turn the detector 81 on and off and thus control the sensitivity of probe 24 at selected times by applying or removing a voltage to the collector of this transistor 94. The output of a detector 81 is applied to the relay drive 82.

At the input of the relay drive there is provided parallel capacitor 98 and resistor 99. The relay drive 82 includes a time adjustable one-shot multivibrator (or monostable) circuit including a pair of solid state elements 101 and 102 preferably NPN transistors. Transistor 101 has a bias resistor 103 connected between the D.C. voltage of terminal 80 and the collector of the transistor 101. The emitter of this transistor is connected directly to ground 68. Similarly, a bias resistor 104 is connected between the D.C. bias voltage at terminal 80 and the collector of the transistor 102 and the emitter of this transistor is connected directly to ground. A charging capacitor 105 and a diode 106 are connected between the collector of the transistor 101 and the base of the transistor 102. A resistor 107 is connected between capacitor 105 and diode 106 and the D.C. voltage at terminal 80. A bias resistor 108 is connected between the common connection of diode 106 and the base of transistor 102 and ground. A feedback loop including a resistor 110 and a diode 111 is connected between the collector of the transistor 102 and the base of transistor 101. This arrangement of the two transistors is essentially a monostable multivibrator circuit having an input signal applied to the base of transistor 101 from the detector 81. This input signal from detector 81 is the result of a fast contact by the probe 24 with the plant and is a very sharp pulse or voltage spike of short time interval which is sufficient to trigger the multi-vibrator circuit. In the operation of the multivibrator circuit, capacitor 105 alternately charges and discharges with conduction first of transistor 101 and then transistor 102 in a multivibrator action, so that the output of the multivibrator or the conduction of transistor 102 has a substantially longer time interval than that produced by the probe 24 in contact with the plant for utilization by the relay 116. Actuation or conduction of transistor 102 controls an electronic switch including a solid state element 112 preferably an NPN transistor having a resistor 113 connected between its base and the collector of transistor 102 and a bias resistor 114 connected between its base and ground. A diode 115 for reducing the effect of short voltage spikes is connected between the collector of this transistor and the D.C. voltage of terminal 80 and across the coil portion 116 of relay 83.

When transistor 112 is triggered by the multivibrator circuit, it essentially applies the D.C. voltage at terminal 80 to the coil portion 116 of the relay thereby closing or switching to ground 120 three sets of normally open contacts or switches 117, 118 and 119 in the relay 83. Contact 117 is connected to one electric terminal of solenoid 51 and the D.C. voltage 80 to the other electrical terminal of solenoid 51 so that closure of contact 117 energizes the solenoid 51 to effect movement of the cutter member as previously described. Contact 118 is connected to the detector control 84 and ultimately disables or turns the detector off to desensitize the probe as hereinafter described. Contact 119 is connected to the ground side of coil 116 and through normally closed switch 121 to ground 120, so that when contact 119 is closed by energization of relay coil 116 the relay coil is held in an energized position or locked on, thereby retaining solenoid 51 in an energized position through contact 117. This holding condition remains until the cutter member 31 has swung to its uppermost position shown in FIG. 3 in broken lines, at which time the switch 121 is opened, breaking the holding circuit through contact 119 and deenergizing coil portion 116 to open contact 117 and deenergize solenoid 51 so as to permit the cutter member to swing back to the cutting position under the control of spring 56.

The detector control 84 includes a solid state element 123 preferably a PNP transistor having its emitter connected to D.C. terminal 80 and its collector connected to the collector of the detector transistor 94. A bias resistor 124 is connected between the emitter and base of transistor 123. A resistor 125 is connected in series with the base of transistor 126 and in series with another solid state element 126 preferably the collector and emitter of an NPN transistor with the emitter connected to ground. Normally open switch 58 responsive to the distance marker 60 is connected to the base resistor 125 and across the collector and emitter of transistor 126 to bypass transistor 126 and ground the base of transistor 123 through resistor 125. A voltage divider including a resistor 127 and a resistor 128 is connected between the collector of the transistor 123 and ground 68. The base of transistor 126 is connected between resistors 127 and 128 at terminal 129 which is also connected to the arm of contact or switch 118 in the relay.

When the switch 58 is closed by the distance marker 60 the base of the transistor 123 is grounded through resistor 125 and this transistor conducts to apply a D.C. voltage from the power source 80 to the detector 81 or more specifically the collector of the detector transistor 94. A portion of this voltage is fed back through resistor 127 to terminal 129 to the base of the transistor 126, thereby keeping this transistor energized when the switch 58 is closed. This voltage on the collector of transistor 94 makes the probe sensitive as hereinabove referred to so as to activate the circuitry between the detector 81 and the solenoid 51 as hereinabove described. This condition is maintained until the probe contacts another plant to cause the energization of the relay coil 116 thereby closing contact 118 grounding the voltage to the base of transistor 126 which shuts both transistors 123 and 126 of the detector control 84 off until switch 58 is again closed by the distance marker 60.

Referring now to FIGS. 7, 8 and 9, an alternate drive arrangement for the cutter member is shown along with associated circuitry substituted for and used in combination with the electronic circuitry of FIG. 6. This arrangement includes a cutter member 31 including a shank portion 32 and a blade 35 similar to that previously described which is pivotally suported on a mobile body as for example a standard beet cultivator. Depending shank portions 131 and 132 of such a cultivator are illustrated in FIGS. 7 and 8. A probe may be secured to the cultivator in spaced relation to the cutter member in the manner previously described with respect to mobile vehicle A and the cultivator is provided with a distance marker such as the cammed wheel with an associated switch for distance measurement as previously described.

A shaft 133 extends between the two cultivator shanks 131 and 132 at their lower ends. The member 35 includes a horizontal extension 134 disposed below the shaft 133 having collars attached at each end which fit on the shaft 133 so as to pivotally support the cutter member 31 about a substantially horizontal axis. Bearing surfaces are provided in collars 135 and 136 for free-swinging movement of the cutter member.

A horizontal support member 138 having depending end portions 139 and 140 at each end extends transverse or at right angles to the depending shank members 131 and 132 and is supported thereon for support of electric solenoids. An electric solenoid 142 has one of its core ends attached to the depending portion 139 and its other core end attached near the top of the shank 32 of the cutter member below its pivot point on shaft 133. When energized, solenoid 142 pulls its core portion into its coil portion to swing or pivot the cutter member to the out-of-cutting position as indicated at 143.

Another electric solenoid 144 has one of its core ends attached to the depending portion 140 and its other core end attached near the top of shank 32 of the cutter member below the pivot point and oppositely of the attachment of solenoid 142. When energized, solenoid 144 pulls its core portion into its coil portion to hold the cutter member in its cutting position as shown in FIG. 7.

A cam surface 146 is provided at the top of cutter member 31 and a normally closed electric switch 147 is supported on member 138 above the cam surface so that the came surface does not engage the switch 147 when the cutter member is in the normal cutting position. When the cutter member is pivoted by actuation of the solenoid 142 to the upper extremity of its out-of-cutting position 143 the switch 147 is actuated or opened.

Referring now to the circuit diagram of FIG. 9, solenoid 142 for moving the cutter member to the out-of-cutting position is connected between the D.C. source terminal 80 and a relay contact 148 grounded to 120 at one side so that closure of this relay contact 148 upon energization of coil 116 grounds the one side of the solenoid 142 and thereby connects the potential at 80 across the solenoid to actuate the solenoid 142. This swings the cutter member 31 from the normal cutting to an out-of-normal cutting position. Energization of the relay coil 116 results from actuation of the transistor 112 as previously described. A diode 141 is connected across the winding of solenoid 142.

The other solenoid 144 has one terminal connected to ground and is normally connected at its other terminal to the D.C. power terminal 80 through a normally closed relay switch 149 so that it is energized and holds the cutter blade 31 in the normal cutting position (FIG. 7). However, when the relay coil 116 is energized in response to a plant contacting the probe the solenoid 144 is deenergized by opening switch 149 and solenoid 142 energized through the closing of switch 148 to swing the cutter member out of the row as previously described. Switch 147 is normally closed and is electrically connected between the D.C. voltage terminal 80 and coil 116 so that the actuation of transistor 112 applies the D.C. voltage across relay coil 116 to switch contacts 118, 148 and 149 to energize solenoid 142 and deenergize solenoid 144. When the cutter member has pivoted to the upper extremity of its out-of-cutting position and cam surface 146 engages the switch 147 then the connection of coil 116 to terminal 80 is broken and solenoid 112 is deenergized and at the same time so that solenoid 144 is energized through contact 149 to return the cutter member to the cutting position and hold it in that position until coil 116 is again actuated or energized in response to a probe plant contact.

In the operating of the above described apparatus for combined thinning and weeding, the cutter member with its associated blade 35 is normally disposed adjacent the plant row either on, above, or below the ground surface to cut vegetation (crop plants or weeds) in the row. When the probe is sensitive and senses a crop plan in the row, the cutter member swings out and stays out of the row until the sensed plant is passed by the blade at which time the blade is returned to the cutting position in the row. The distance marker 60 disables the sensitivity of the probe so as to permit cutting of vegetation (both crop plants and weeds) for a selected distance so as to provide a selective or predetermined spacing between desired crop plants.

With the control arrangement as described, the interval during which the cutter blade is out of the row to avoid a sensed plant and the interval during which the blade travels along the row in the cutting position for desired spacing of crop plants are variable to meet various requirements. The practice of this invention recognizes that such intervals may be established in various ways and may be measured either in time intervals by various types of mechanical or electrical timing means and also in distance intervals such as the cammed wheel for the distance marker 60 as described.

After the crop plants have been finally thinned or are spaced as desired, they frequently require weeding only. By either closing switch 58 during the entire operation or removing it from the circuit, the above described apparatus will conveniently weed only. Under these conditions, the probe 24 is sensitive at all times and when set at a preselected elevation will sense the growing crop plant and swing the blade to avoid each crop plant in the row and return the blade to cut the weeds between each sensed crop plant, thus removing weeds only.

The apparatus as above described has been found to be particularly effective where thinning followed by weeding operations are utilized in fields treated with chemical herbicides. Such herbicides usually have no retarding effect on plant seeds such as sugar beet seeds whereas they effectively retard early weed growth. As a consequence, such a beet plant has an opportunity to reach an initial plant growth stage placing the top of such plants well above the level of adjoining weeds so that an electric probe described herein or other similar sensing means can easily distinguish between weeds and crop plants.

While I have particularly shown and described one particular embodiment of the invention, it is distinctly understood that the invention is not limited thereto but that modifications may be made within the scope of the invention.

I claim:

1. Row crop thinner and weeder apparatus comprising a mobile body, inclusive of a substantially horizontal frame member, a wheel and axle assembly attached to the rearward portion for movably supporting the frame member above the plant row, and means attached to the frame for moving the body along a plant row, a probe supported over the plant row for contacting the growing plants in said row, a cutter member pivotally supported on said frame member rearwardly of the probe and disposed in a normal cutting position adjacent the surface of the row for removal of vegetation in the row, drive means responsive to the movement of said wheel and axle assembly for selectively swinging the cutter member about its pivotal axis to a position out of contact with plants in the row, said drive means including a hollow drum inclusive of an inner surface mounted on a shaft extending lengthwise of the frame member and in direct drive relation to the wheel and axle assembly and a shoe supported adjoining the inner surface of the drum with an electric solenoid connected to said shoe and said cutter member for selectively driving the shoe against the drum for rotation of the cutter member with said drum when the solenoid is energized, and control means responsive to probe contact with a growing plant in the row for energizing said solenoid to move said cutter member to its out-of-normal position to avoid cutting selected plants in the row and for returning the cutter member to its normal cutting position after a predetermined time interval.

2. Row crop thinner and weeder apparatus comprising a horizontally disposed frame having a wheel support at its rear, means associated with the frame for moving the apparatus along a row of growing plants, a plant-contacting proble carried along the row, a cutter member pivotally supported on the frame rearwardly of the probe having a cutting surface in a normal, at-rest, cutting position centered along the row and adjacent the row surface, drive means responsive to the wheel movement for swinging the cutter about its pivotal axis to dispose the cutting surface in a second position out of contact with the plant row, said drive means including a hollow drum mounted for rotation on a horizontal shaft driven by wheel movement, a shoe supported adjacent an inner surface of the drum and connected to a solenoid directing cutter movement, and control means directed by probe contact with a growing plant for energizing said solenoid to selectively drive the shoe against the drum for rotation of the cutter member with the drum to said second position and for return of the cutter to its normal at-rest position after a predetermined time interval.

3. Apparatus as defined in claim 2, wherein the frame includes hingedly joined forward and rear portions, and means for varying the angle between said sections so as to change the effective elevation of the cutter.

4. Apparatus as defined in claim 2, in which the cutting surface of the cutter member is disposed below the surface of the row during its at-rest movement along the row, and said second position is laterally of the row and in elevated relation to the surface of the row.

5. Apparatus as defined in claim 2, wherein said probe member is supported above the plant row by support means inclusive of a depending member pivotally attached at its forward end to the frame and extending rearwardly to skid portions slidable along the ground outwardly of the probe and plant row.

6. Apparatus as set forth in claim 5, wherein said support means includes means for supporting the probe member intermediate the pivotal attachment and skid surfaces of the depending member in selected positions toward and away from said cutter member.

7. Apparatus as set forth in claim 5, wherein said support means includes means for supporting the probe member intermediate the pivotel attachment and skid surfaces of the depending member in selected positions above said plant row.

8. Row crop thinner and weeder apparatus comprising a horizontally disposed frame having a wheel support at its rear, means associated with the frame for moving the apparatus along a row of growing plants, a plant contacting probe carried along the row, a cutter member pivotally supported on the frame rearwardly of the probe having a cutting surface in a normal, at-rest, cutting position centered along the row and adjacent the row surface, drive means responsive to the wheel movement for swinging the cutter about its pivotal axis to dispose the cutting surface in a second position out of contact with the plant row, said drive means including a hollow drum mounted for rotation on a horizontal shaft driven by wheel movement, a shoe supported adjacent an inner surface of the drum and connected to a solenoid directing cutter movement, sensing means responsive to probe contact with a growing plant for energizing said solenoid to selectively drive the shoe against the drum for rotation of the cutter member with the drum to said second position for a predetermined time interval, means for returning the cutter to its normal at-rest position after said actuation, and means for disabling said sensing means for a preselected distance interval of probe travel to maintain the cutter member in its normal at-rest position and thereby provide preselected spacing between growing plants in the row.

9. Apparatus as set forth in claim 8, in which at least one solenoid is mounted within the hollow drum.

10. Apparatus as defined in claim 8, in which said drive means includes a first electric solenoid connected to the cutter member to move the cutter member out of contact with a plant and said returning means is a second electric solenoid connected to the cutter member which is normally energized to hold the cutter member in the cutting position.

11. Apparatus as defined in claim 8, in which the drive means includes a clutch assembly connected to the cutter member and responsive to movement of the apparatus along a plant row for selectively moving said cutter member.

12. Row crop thinner and weeder apparatus comprising a horizontally disposed frame having a wheel support at its rear, means associated with the frame for moving the apparatus along a row of growing plants, a plant-contacting probe carried along the row, a cutter member pivotally supported on the frame rearwardly of the probe having a cutting surface in a normal, at-rest, cutting position centered along the row and adjacent the row surface, drive means responsive to the wheel movement for swinging the cutter about its pivotal axis to dispose the cutting surface in a second position out of contact with the plant row, an automatic control inclusive of sensing means responsive to probe contact with a growing plant for activating the drive means to move the cutter member to its said second position during a predetermined time interval to avoid cutting contacted plants in a row, means for returning said cutter member to its normal at-rest cutting position in the row after said actuation, and means for disabling said sensing means for a preselected distance interval of travel of said probe to maintain the cutter member in its cutting position and thereby provide a preselected spacing between growing plants in the row.

13. Apparatus as defined in claim 12, inclusive of means for varying the elevation of a lower blade portion of said cutter member to selected cutting elevations above, on and below the soil surface of the plant row.

References Cited

UNITED STATES PATENTS

| | | | |
|---|---|---|---|
| 1,884,009 | 10/1932 | Lofstrand | 172—105 X |
| 2,177,803 | 10/1939 | Forte et al. | 172—6 |
| 2,592,689 | 4/1952 | Hann | 172—6 |
| 3,027,950 | 4/1962 | Cascarine | 172—108 X |
| 3,233,681 | 2/1966 | Ferte | 172—6 |
| 3,358,775 | 12/1967 | Garrett | 172—6 |

FOREIGN PATENTS 1,284,063   1/1962   France.

ANTONIO F. GUIDA, Primary Examiner

ALAN E. KOPECKI, Assistant Examiner